United States Patent
Millington et al.

(10) Patent No.: US 6,873,907 B1
(45) Date of Patent: Mar. 29, 2005

(54) NAVIGATION SYSTEM WITH USER INTERFACE

(75) Inventors: Jeffrey Alan Millington, Rochester Hills, MI (US); Kenneth Glenn Maxwell, Croswell, MI (US); Michael Mouser, Ortonville, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

(21) Appl. No.: 10/088,017
(22) PCT Filed: May 5, 1999
(86) PCT No.: PCT/US99/09779

§ 371 (c)(1),
(2), (4) Date: Sep. 9, 2002

(87) PCT Pub. No.: WO99/57521

PCT Pub. Date: Nov. 11, 1999

Related U.S. Application Data (60) Provisional application No. 60/084,227, filed on May 5, 1998, and provisional application No. 60/084,228, filed on May 5, 1998.

(51) Int. Cl.[7] .............................................. G01C 21/26
(52) U.S. Cl. ...................... 701/209; 701/200; 701/208
(58) Field of Search ............................ 701/19, 20, 204, 701/205, 207, 208, 211, 213, 117, 119, 120, 121, 1; 340/788, 990, 995.1, 989, 993, 995.19, 995.12, 991; 342/450, 451, 457

(56) References Cited

U.S. PATENT DOCUMENTS 5,479,602 A   12/1995   Baecker et al.
6,321,158 B1 * 11/2001   DeLorme et al. ........... 701/201
6,515,595 B1 *  2/2003   Obradovich et al. ........ 701/213
6,529,824 B1 *  3/2003   Obradovich et al. ........ 701/208
6,631,322 B1 * 10/2003   Arthur et al. ............... 701/211

FOREIGN PATENT DOCUMENTS

| EP | 0 478 438 A1 | | 1/1992 |
| EP | 0 704 676 A1 | | 3/1996 |
| EP | 0829704 | * | 3/1998 |

* cited by examiner

Primary Examiner—Richard M. Camby
(74) Attorney, Agent, or Firm—Lowe Hauptman Gilman & Berner, LLP (57) ABSTRACT

A navigation system that includes a graphic user interface displaying a plurality of icons. An icon selectively activated by a user input device is enlarged, animated, and includes a text flag indicating what the icon represents. Some of the icons are associated with a plurality of potential destinations for the navigation system. The icons are animated by displaying a plurality of frames sequentially. The first frame is a base frame full bit map which includes information for displaying all of the pixels of the icon. The second frame is displayed by changing only the pixels which are different between the first frame and the second frame based upon a transition file which only includes information for the pixels to be changed. A second transition file indicates the pixels to be changed between the second frame and the third frame, and so on. For icons with many potential frames, more than one base frame may be provided, so that any state can be reached more quickly.

16 Claims, 12 Drawing Sheets

NAVIGATION SYSTEM WITH USER INTERFACE

This application claims benefit of Provisional Appls. 60/084,227 and 60/084,228 both filed May 5, 1998.

BACKGROUND OF THE INVENTION

The present invention relates generally to in-vehicle navigation or "route-guidance" systems and more particularly to an improved graphical user interface for such systems.

In-vehicle navigation systems generally comprise motion and position-determining devices, such as GPS receivers, accelerometers, etc. which determine the current position of a vehicle relative to a database of roads. A graphical user interface, typically including a display and user input device, enables the user to select a destination from the database of roads. The display then provides tun-by-turn instructions to the driver guiding the driver to the desired destination from the current position.

In some known navigation systems, the graphical user interface provides a hierarchical menu for selecting a desired destination. For example, the driver initially selects from several groups of destinations such as: "intersections," "points of interest," "cities," "street address," etc. After selecting one of the groups of destinations, the user may be provided with another plurality of subgroups of destinations. For example, after selecting "points of interest," the driver may then select from among hotels, grocery stores, theaters, etc.

The known navigation system provides text-based menus. The display typically provided in the navigation system is typically three to five inches diagonally; therefore, a graphical user interface which is efficient in both communicating information and receiving input from the driver is desirable.

SUMMARY OF THE INVENTION

The present invention provides a vehicle navigation system having a display including a plurality of icons, each associated with a plurality of potential destinations in a database or other options. A user input device selectively activates one of the plurality of icons. When activated, the activated icon is enlarged, includes a text flag adjacent the icon, and is animated. Preferably, the animated icon comprises a three or four frame animation. The animation of the activated icon provides an efficient graphical user interface in that the concept with which the icon is associated is more readily perceivable and is reinforced by the animation.

In a preferred embodiment, the animation of the activated icon is provided utilizing at least one base frame and a plurality of transition files. The base file includes all the necessary information for displaying all of the pixels in the icon in a first state. A first transition file contains only that information necessary to transform the icon from the first state to a second state. A second transition file contains only that information necessary to transform the icon from the second state to a third state, and so on.

In an alternative embodiment, the icon may comprise a graphic indicator, such as a compass. The icon includes a plurality of base frames, each comprising all of the information for all of the pixels necessary to represent the icon in each of a plurality of states, which for a compass is preferably the North, South, East and West positions. A plurality of transition files each include information necessary to transform the compass to intermediate states from each of the base frames and to other intermediate states.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

Figure 1:
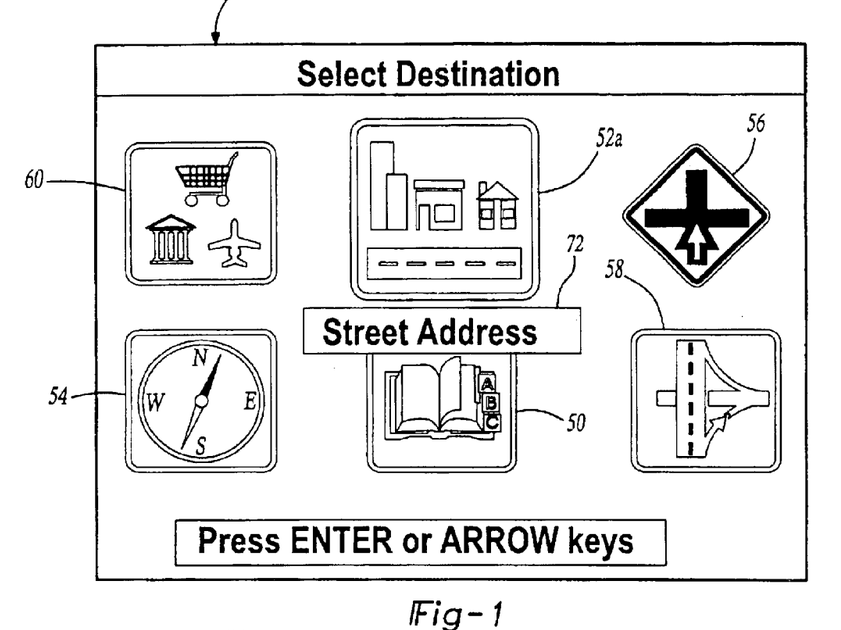
FIGS. 1–3 illustrate the three sequential frames for animation of the street address icon.
Figure 1A:
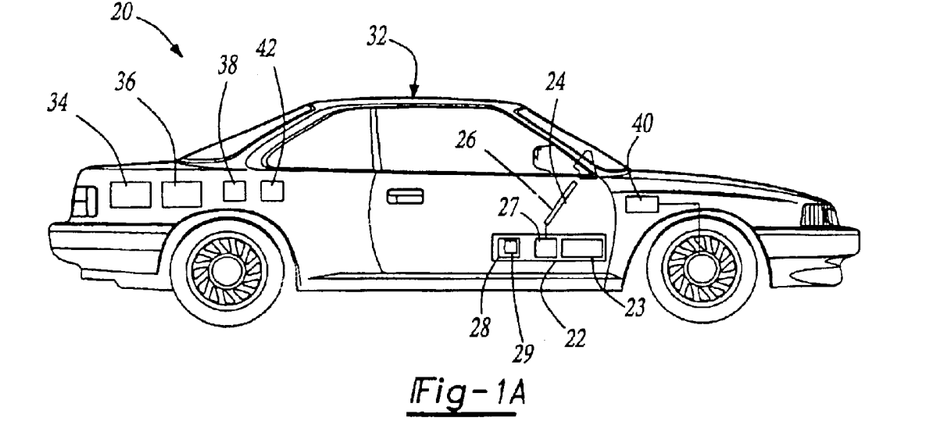
FIG. 1A is a schematic of the navigation system of the present invention.

The navigation system 20 of the present invention is shown schematically in FIG. 1A. The navigation system 20 includes a CPU 22 having memory 23 (such as RAM) and connected to a display 24, such as a high resolution LCD, LED or other flat panel display. The CPU 22 is also connected to an input device 26 such as a mouse, keyboard, key pad, remote device or microphone. Preferably, the input device 26 is an eight-way directional keypad as described in co-pending application Ser. No. 09/037,772 entitled "Navigation System with Character Input Device" filed Mar. 10, 1998, which is assigned to the assignee of the present invention and hereby incorporated by reference. Alternatively, the display 24 can be a touch screen display. The CPU 22 preferably further includes VRAM 27 for the display 24.

The navigation system 20 further includes a storage device 28, such as a hard drive 28 or CD ROM, connected to the CPU 22. The storage device 28 contains a database 29 including a map of all the roads in the area to be traveled by the vehicle 32 as well as the locations of potential destinations, such as addresses, hotels, restaurants, or previously stored locations. The software for the CPU 22, including the graphical user interface, route guidance, operating system, position-determining software, etc may also be stored in storage device 28 or alternatively in ROM or flash memory.

The navigation system 20 preferably includes position and motion determining devices, such as a GPS receiver 34, a gyroscope 36, a compass 38, a wheel speed sensor 40 and a multi-axis accelerometer 42, all connected to the CPU 22 (connections not shown for simplicity). Suitable position and motion determining devices are well known and are commercially available.

As is well known, the position and motion determining devices determine the position of the vehicle 32 relative to the database of roads utilizing dead-reckoning, map-matching, etc. Further, as is known in navigation systems, the user can select a destination relative to the database of roads utilizing the input device 26 and the display 24. The navigation system 20 then calculates and displays a recommended route directing the driver of the vehicle 32 to the desired destination. Preferably, the navigation system 20 displays turn-by-turn instructions on display 24, guiding the driver to the desired destination.

FIG. 1 illustrates the display 24 of FIG. 1A displaying a menu of icons 50–60, from which the user can choose. Each of the icons 52, 56, 58, 60 is associated with a plurality of locations in the database, a method of selecting a destination relative to the database. The icons 50–60 include an address book icon 50, a street address icon 52a (shown activated), off-road navigation icon 54, intersection icon 56, freeway entrance/exit icon 58, and points of interest icon 60. Of course, other icons could also be included or substituted. The address book icon 50 is associated with a plurality of previously stored destinations that the user has stored and associated with a name or other indicator. Via the street address icon 52 the user enters a street address or the location as the destination. The off-road navigation icon 54 causes the navigation system 20 to enter a navigation mode for off-road navigation. Via the intersection icon 56, the user enters the names of two streets, the intersection of which will be chosen as the destination. If the user selects the freeway entrance/exit icon 58 the user will be prompted to enter the freeway and entrance or exit to be chosen as the destination. The points of interest icon 60 is associated with a plurality of destinations which are grouped by type, such as hotels, restaurants, airports, stores, etc.

Preferably, only one of the icons 50–60 is activated and the remainder are inactive at any one time. In the Figures, the numeral references 50–60 represent inactive icons, while numeral references with letter designations (a–e) represent the respective frames of a corresponding animated icon. As will be described in more detail below, the activated icon becomes animated, enlarged and a text flag is added adjacent the icon, thus distinguishing it from the inactive icons. Preferably, each animated icon 50–60 comprises a three to five frame animation. Further, an audible output of a voice also identifies the currently activated icon. When an activated icon is selected (such as by pressing an "enter" key on the input device 26), the display 24 then displays appropriate subsequent screens, prompting the user to choose from among the locations associated with the activated icons or enter the requested information.

Preferably, the street address icon 52a is activated and animated initially, i.e. prior to any input from input device 26, as shown in FIG. 1. Then, using the user input device 26, which is most preferably a directional input device, the other icons 50, 54–60 can be selectively activated. Preferably the user input device 26 is an eight direction keypad. Thus, any one of the icons 50, 54–60 can be activated with a single keystroke.

Figure 2:
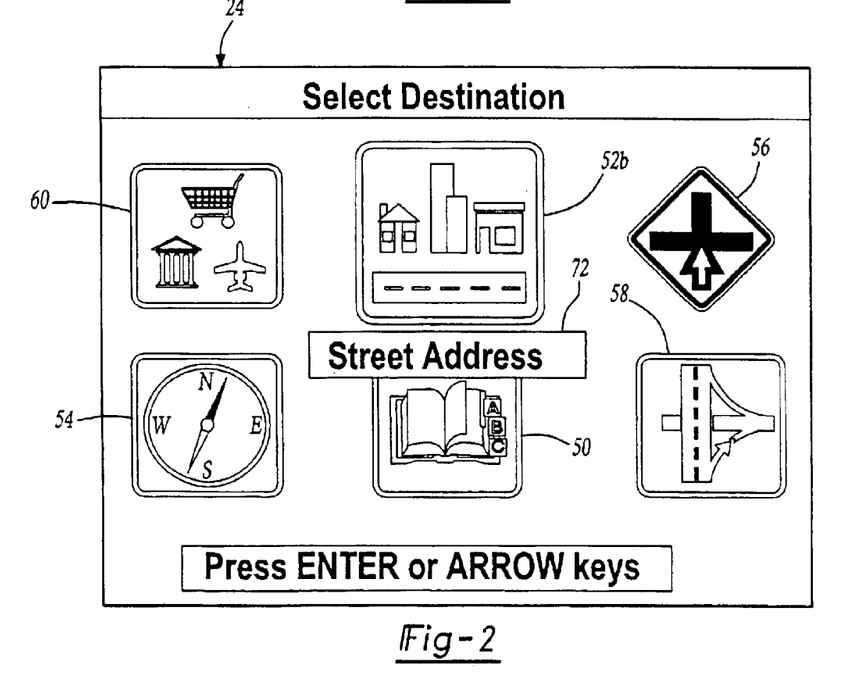
Figure 3:
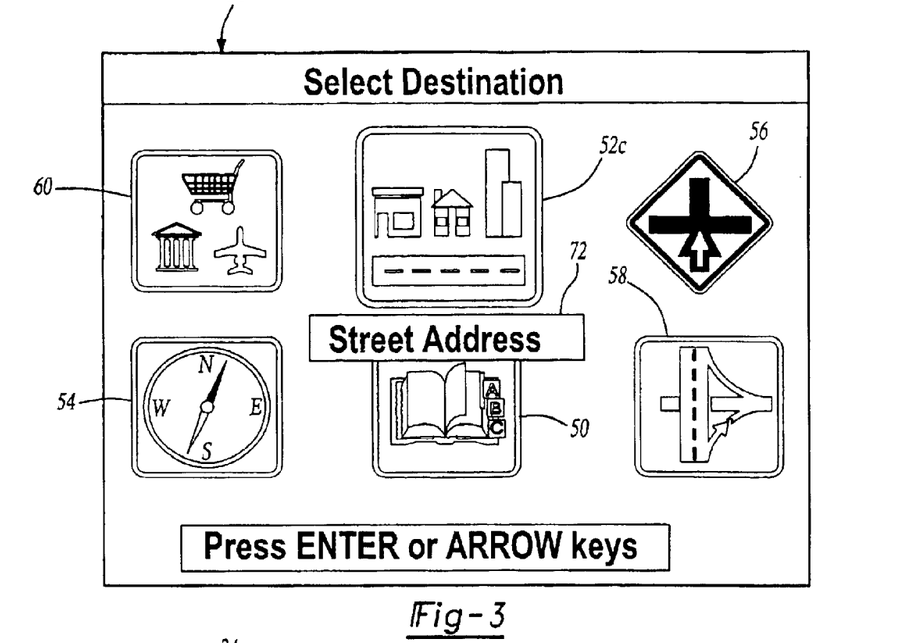
Figure 4:
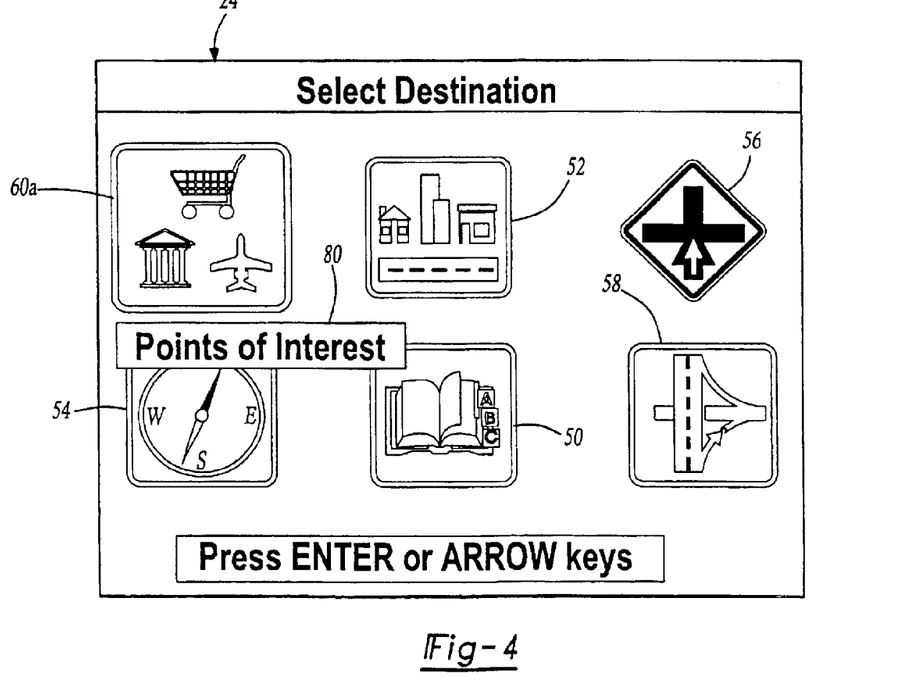
FIGS. 4–8 illustrate the five sequential frames for animation of the points of interest icon.
Figure 5:
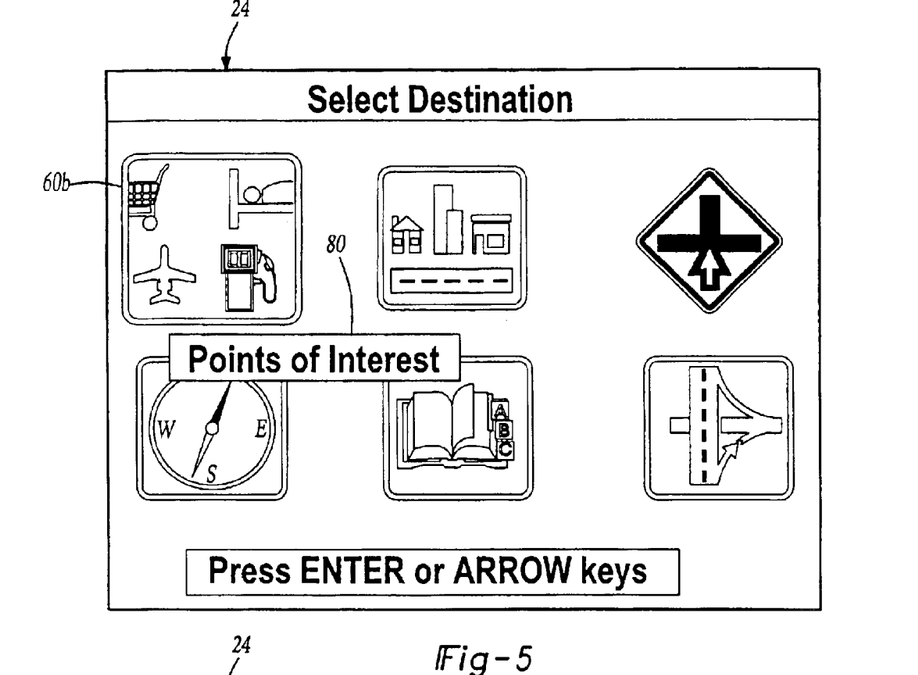
Figure 6:
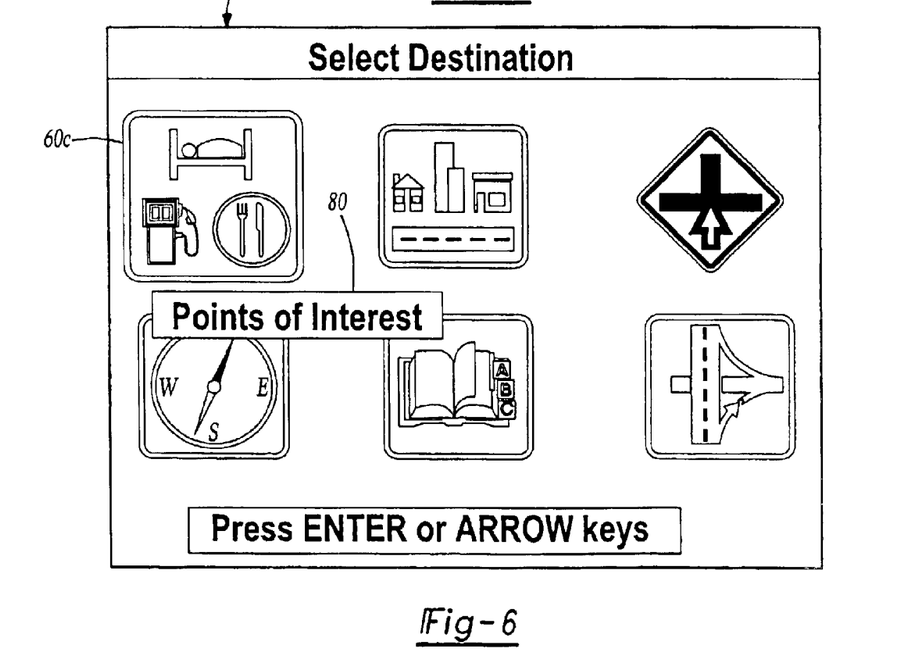
Figure 7:
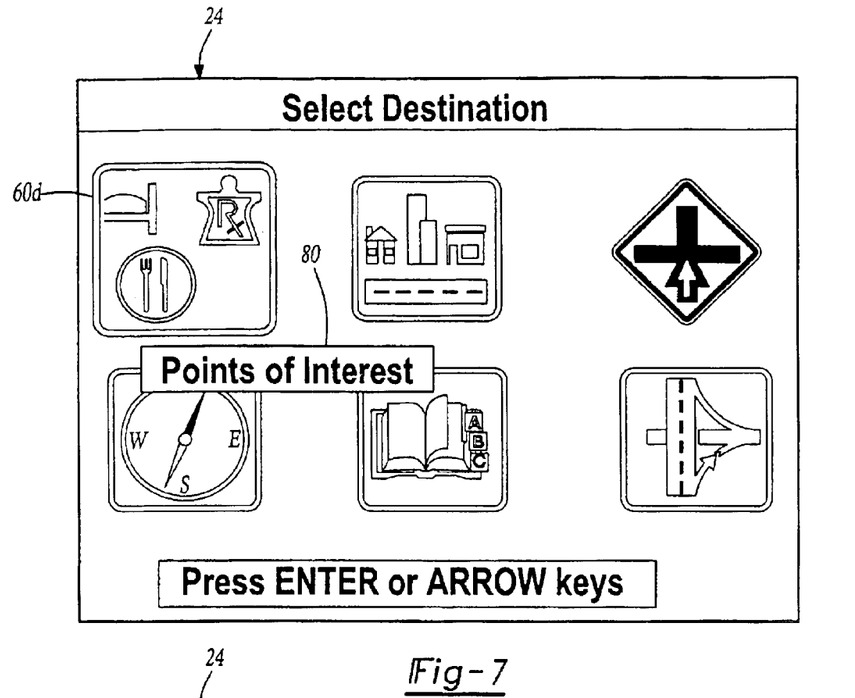
Figure 8:
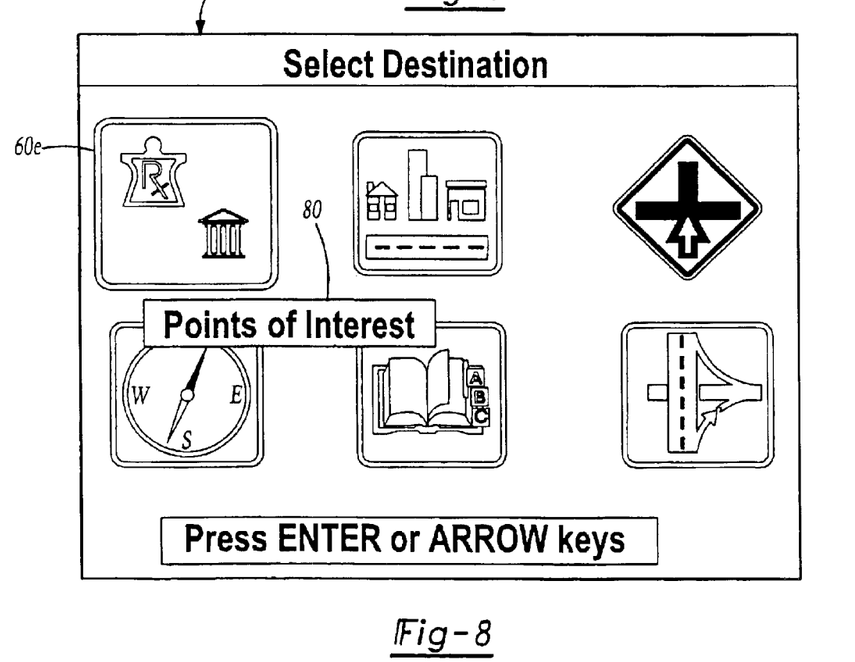

FIGS. 1–3 illustrate the three frames 52a–c corresponding to the street address. While the street address icon 52 is activated, it continuously loops through the three frames 52a–c, while the other icons are not animated. The activated street address icon frames 52a–c are enlarged and larger than the inactive icons 50–60. Further, a text flag 72 is displayed adjacent the activated street address icon frames 52a–c. The animation and enlargement clearly and efficiently communicate to the user which icon has been activated. The animation and text flag 72 also reinforce the association and identity of the associated icon 52.

FIGS. 4–8 illustrate the first through fifth frames 60a–60e of the animation of the points of interest icon 60. The points of interest icon 60 continuously loops through the five animation frames 60a–e as long as the points of interest icon is activated. The activated points of interest icons 60a–e are enlarged when activated and include a text flag 80 also identifying the icon 60a–e.

Figure 9:
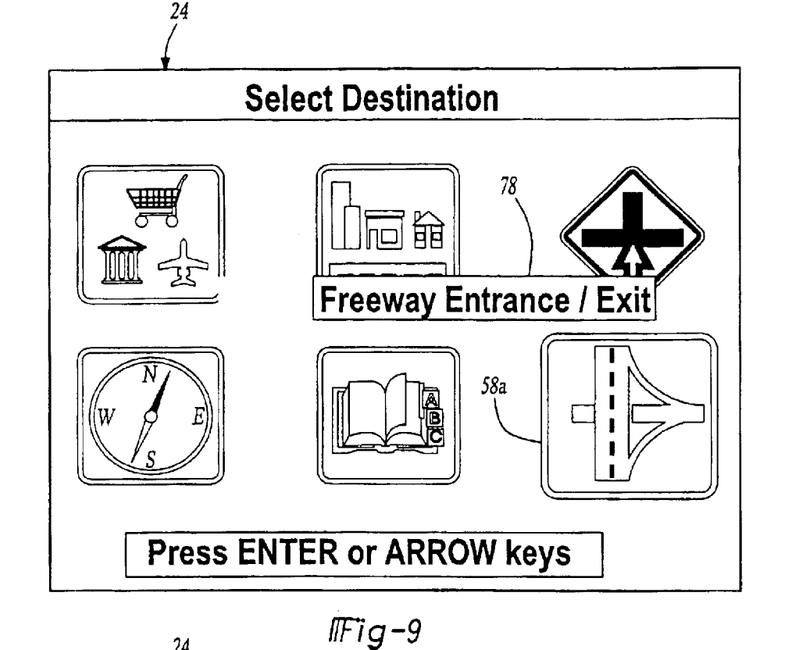
FIGS. 9–10 illustrate the two sequential frames for animation of the freeway entrance/exit icon.
Figure 10:
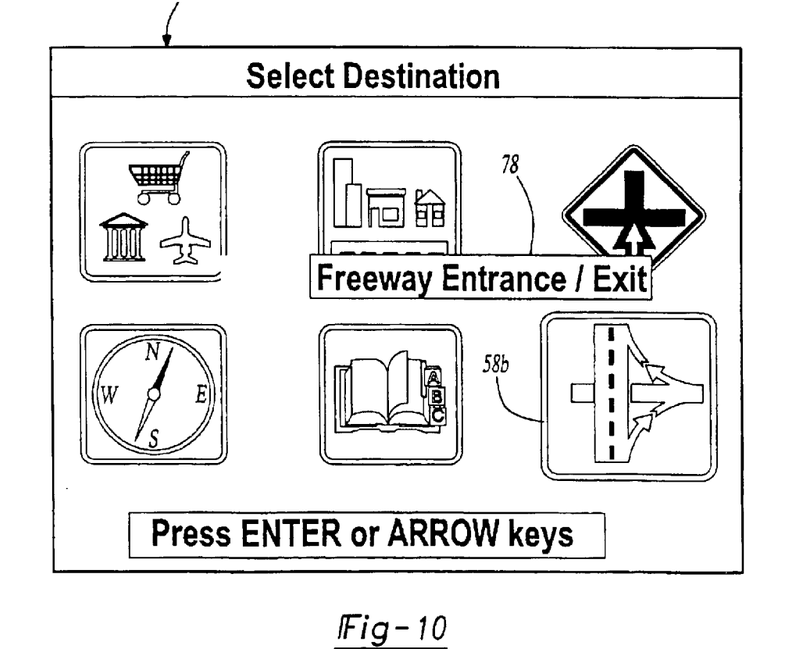
Figure 11:
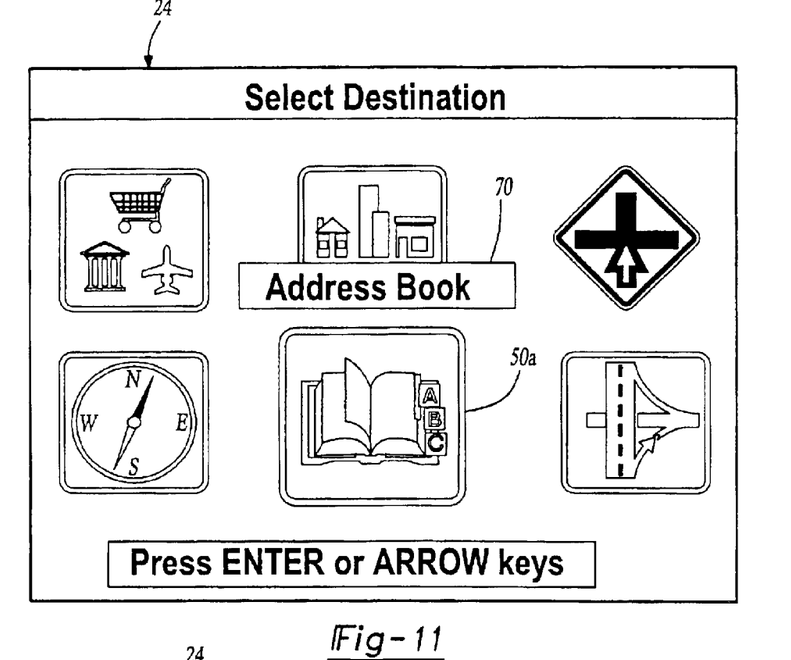
FIGS. 11–13 illustrate the three sequential frames for the animation of the address book icon.
Figure 12:
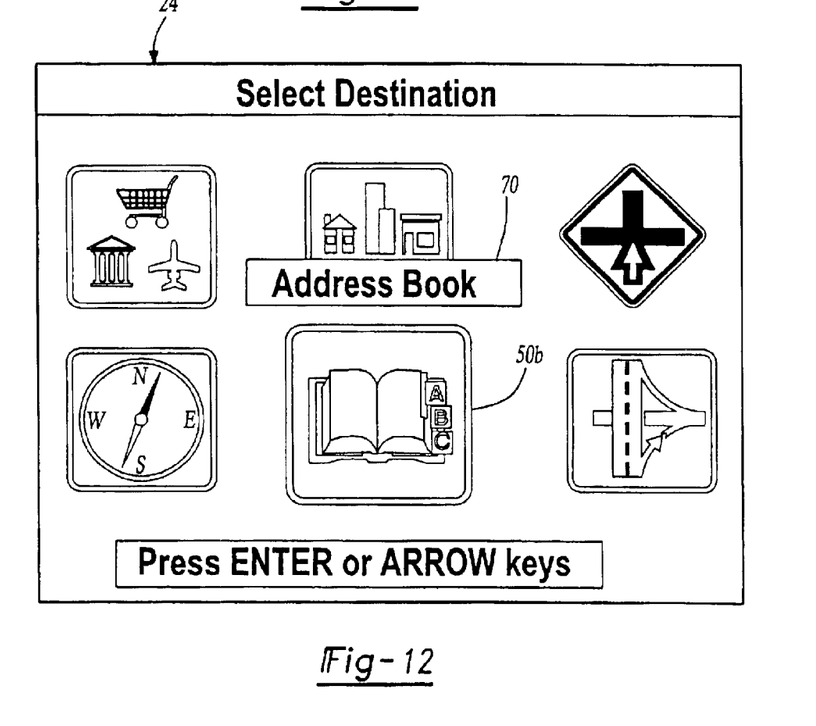
Figure 13:
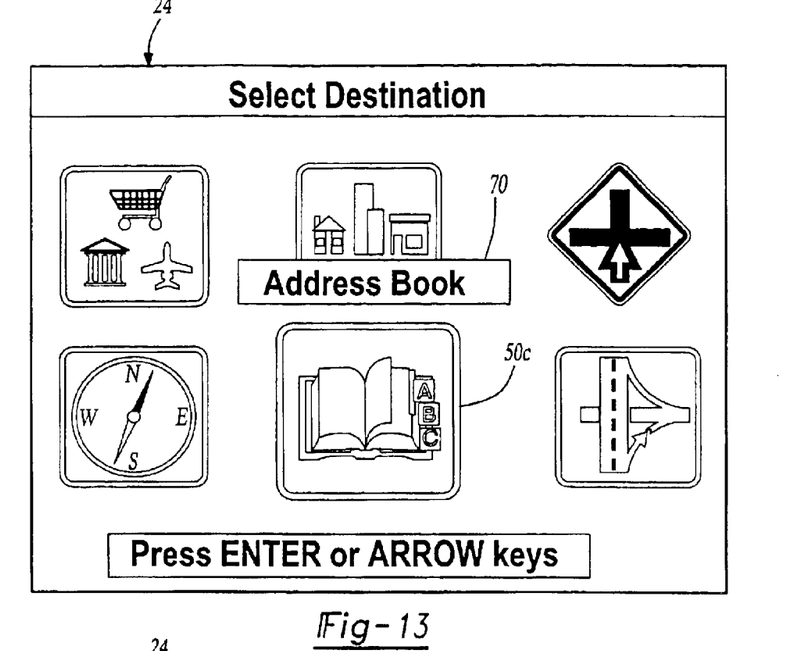
Figure 14:
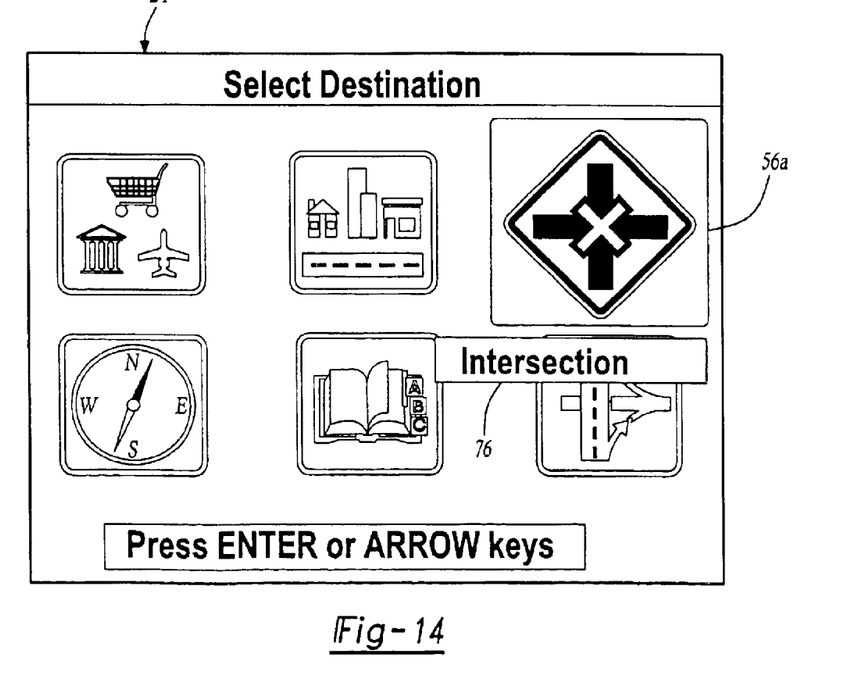
FIGS. 14–16 illustrate the three frames for animation of the intersection icon.
Figure 15:
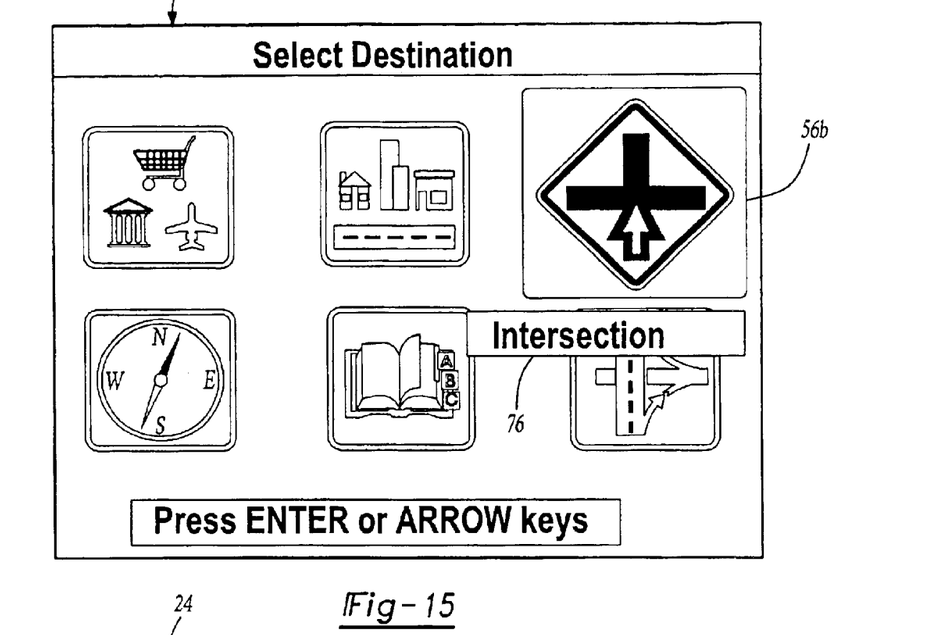
Figure 16:
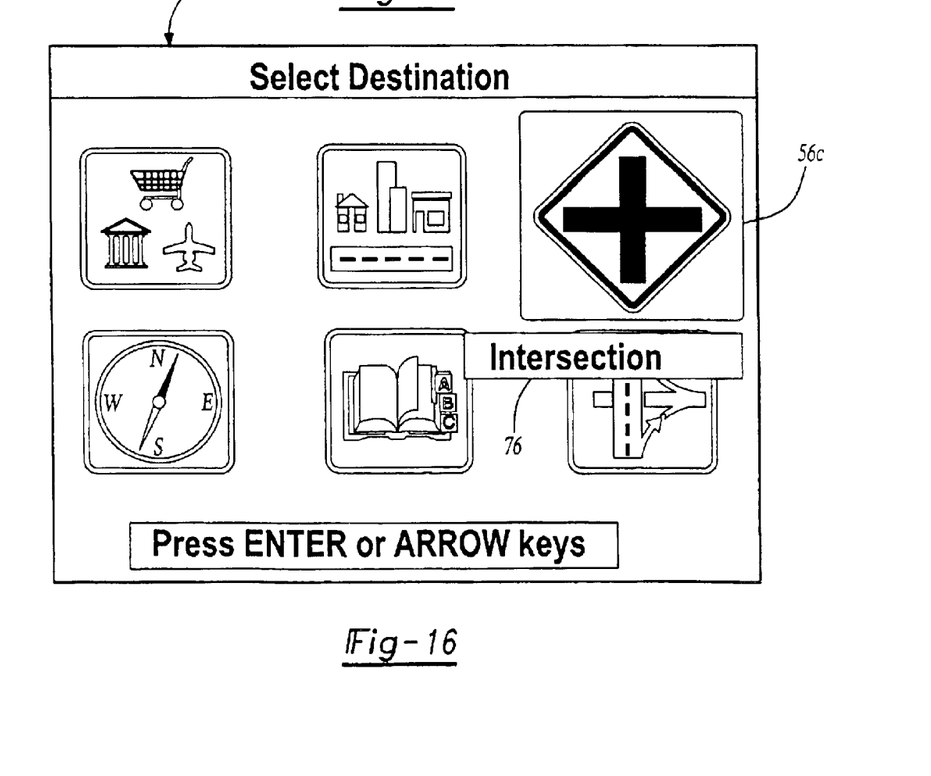

FIGS. 9–10 show the two animated frames 58a–b of the freeway entrance/exit icon 58 and its corresponding text flag 78. FIGS. 11–13 illustrate the first, second and third frames 50a–c respectively of the address book icon 50 and its text flag 70. FIGS. 14–16 show the three animated frames 56a–c of the intersection icon 56 and its text flag 76.

Figure 17:
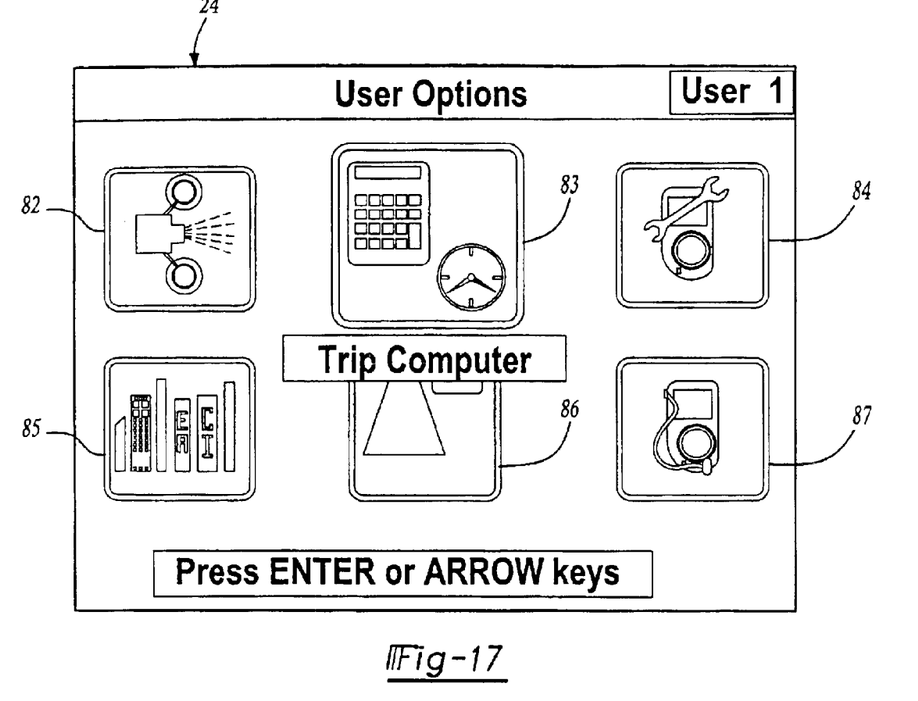
FIG. 17 illustrates an options screen.

The input device 26 includes an "options" button, which when activated causes display 24 to display the options screen shown in FIG. 17. The options screen includes a demonstration icon 82, a trip computer icon 83, a configuration icon 84, services directories icon 85, communications icon 86 and diagnostics icon 87. Each of these is preferably enlarged, animated and displayed adjacent a text flag when activated, as described above.

All of the inactive icons 50–60, 82–87 and the first frame of each active icon 50a, 52a, 54a, 56a, 58a, 60a (and any other screen objects) on the display 24 are "pre-rendered" using a 3D modelling program. The bitmaps of the icons are stored in a "C" language header file. To display the inactive icons 50–60 (such as is shown in FIGS. 1–17) the CPU 22 performs a memory copy from the memory 23 onto the VRAM 27 (FIG. 1). Since the objects are pre-rendered, the computation time and the power required are reduced. Complex rendering, including textures and ray tracing can be utilized without unduly burdening the CPU 22 during run time.

Figure 18:
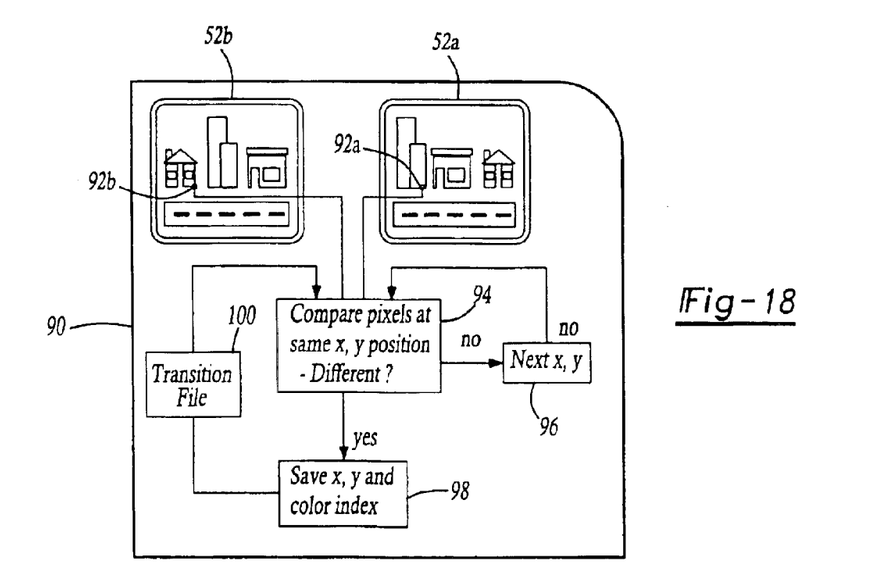
FIG. 18 illustrates a technique for creating the animations of the icons.

FIG. 18 illustrates the technique by which the icons 50–60 in FIGS. 1–17 are animated, shown by way of example with icons 52a and 52b. Each frame 52a, 52b of the animation is first created as a bit map file which contains all of the information, on a pixel-by-pixel basis, for displaying all of the pixels in that frame. Each frame is preferably anti-aliased; a suitable technique is described in co-pending application Ser. No. 09/160,068, filed Sep. 24, 1998, entitled Navigation System With Anti-Alias Map Display, which is hereby incorporated by reference. Then, a computer 90 programmed to operate according to the flow chart in FIG. 18 compares each pixel 92a in the frame 52a with the corresponding pixel 92b (at the same x-y position) in frame 52b in step 94. If the pixel 92 is the same in both frames 52a–b, i.e., the pixel 92 is not changed from one frame 52a–b to the next, the software does not save information relating to that pixel 92 and increments to the next pixel in step 96. If, and only if, the pixel 92 changes in the two consecutive frames 52a, b, then the information indicating how to display that pixel in the second frame 52b saved in step 98. In other words, the only information saved is for the pixels 92 that need to be changed in order to transition from the first frame 52a to the second frame 52b. The pixels 92 that are changed are stored in a transition file 100 which indicates the pixel 92 position (x, y) and the color index to which the pixel is changed. The first frame 52a of the animation (or "base frame"), is a complete bit map indicating how to display all of the pixels in the icon 52a. Information indicating how to change the base frame 52a to the second frame 52b is stored as the transition file 100 and includes only information indicating how to display any pixels 92 that have changed between the base frame 52a and the second frame 52b. Another transition file indicates how to change any pixels from the second frame 52b to the third frame 52c, and so on. It should be noted that the computer 90 which converts the full bit map files to the transition files 100 is preferably run apart from the navigation system 20. The full bit maps, other than the first frame, are not stored on the navigation system 20. Identical techniques are followed for the other animated icons.

In the navigation system 20 (FIG. 1A), to animate the icon 52 the CPU 22 performs a memory copy from the memory 23 onto the VRAM 27 of the base frame 52a as shown in FIG. 1. The CPU 22 then modifies only the pixels in the VRAM 27 as indicated by the first transition file 100 to produce the second frame 52b of the street address icon 52 as shown in FIG. 2. The CPU 22 then modifies the pixels in the VRAM 27 according to a second transition file to produce the third frame 52c of the street address icon 52 as shown in FIG. 3. The CPU 22 then modifies the pixels in the VRAM 27 according to a third transition file to return to the street address icon 52a as shown in FIG. 1. Alternatively, the base frame 52a can be completely reloaded. The CPU 22 and display 24 continue to loop through the frames 52a–c until either the street address icon 52 is selected or another icon is activated.

Upon selection of the off-road navigation icon 54 (e.g. FIG. 1), this same animation technique is preferably used to display a compass (not shown) similar to the off-road navigation icon 54. The compass includes an arrow which is displayable at any one of numerous (up to 360) different rotational positions. The compass preferably includes a plurality of base frames, preferably four, one base frame each of the arrow pointing North, South, East and West. Transition files contain only information indicating how to change the compass from a base frame to an adjacent frame (i.e. an adjacent rotational position of the arrow). If a rapid large change is required, a new base frame closer to the frame to be displayed can be loaded. For example, if the compass is currently displayed with the arrow pointing due North and a change to Southeast is required, the East base frame is loaded, followed by execution of several transition files until Southeast is achieved. Utilization of more than one base frame could also be used for displaying other gauges, such as tachometers.

Figure 19:
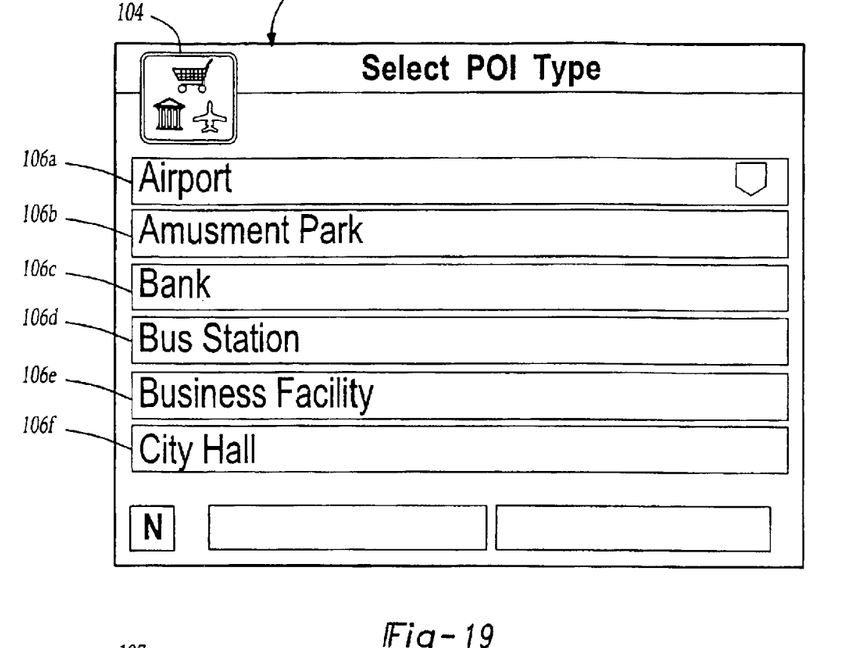
FIG. 19 illustrates the points of interest screen displayed upon selection of the points of interest icon.

FIG. 19 illustrates the points of interest screen displayed on screen 24 after selection of the points of interest icon 60a–e (FIGS. 4–8). In the points of interest screen, a thumbnail POI icon 104 is displayed in the upper left hand corner of the screen. The thumbnail POI icon 104 reminds the user what screen is currently displayed and further reinforces the association of the points of interest icon 60. The points of interest screen also lists a plurality of points of interest types 106a–f, any of which can be selected using the user input device 26 (FIG. 1a). As is known, upon selection of any of the points of interest types 106, a screen listing points of interest of that type are then displayed on display 24. As is known, the user can then select a specific point of interest as a destination for a route for which the navigation system 20 provides turn by turn instructions.

Figure 20:
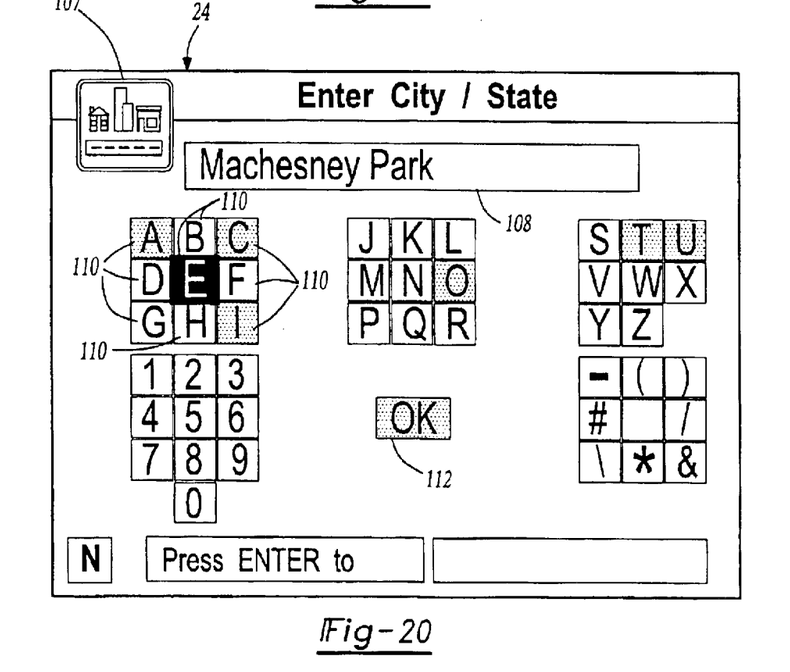
FIG. 20 illustrates the street address screen displayed upon selection of the street address icon.

FIG. 20 shows the street address screen displayed on display 24 upon selection of the street address icon 52a–c (FIGS. 1–3). A thumbnail street address icon 107 (preferably an identical, smaller version of the inactivated street address icon 52, such as in FIG. 4) is displayed in the upper left hand corner of the screen. The thumbnail street address icon 107 reminds the user which screen is displayed and further reinforces the association of the thumbnail street address icon 107, and consequently the street address icon 52 and 52a–c (FIGS. 1–17). Generally, to enter a destination in this mode, the user first enters a city and/or state, followed by a street address in the text field 108 by selecting the character buttons 110. Preferably, the input device 26 is an eight-way cursor pad. Initially, the "okay" icon 112 is activated. Upon the first entry from the eight-way directional input device 26, a corresponding center character 116 ("E","N", "W", "5" or [space]) is activated. The activated character can be selected pressing an "enter" button on the input device 26. Another character immediately surrounding the center character can be activated utilizing the directional input device 26. This is described in more detail in co-pending application U.S. Ser. No. 09/037,772 entitled "Navigation System with Character Input Device" filed Mar. 10, 1998, which is assigned to the assignee of the present invention and hereby incorporated by reference.

Figure 21:
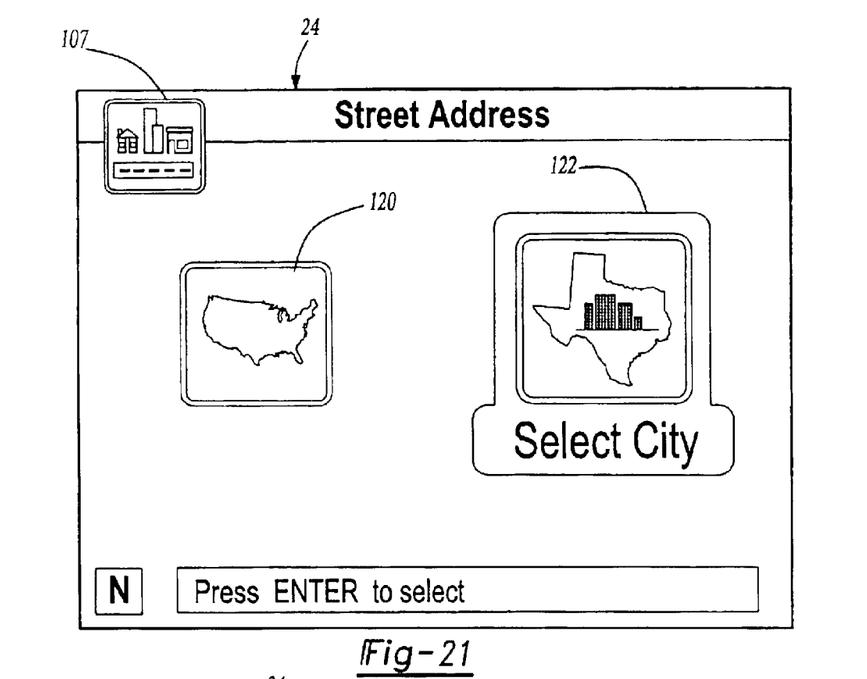
FIG. 21 illustrates a street address screen displayed subsequent to that shown in FIG. 20.

If necessary, the user can select a state or city for the street address by selecting the select state icon 120 and/or select city icon 122 shown in FIG. 21. In FIG. 21, the select city icon 122 is shown activated and enlarged with the adjacent text flag 124.

Figure 22:
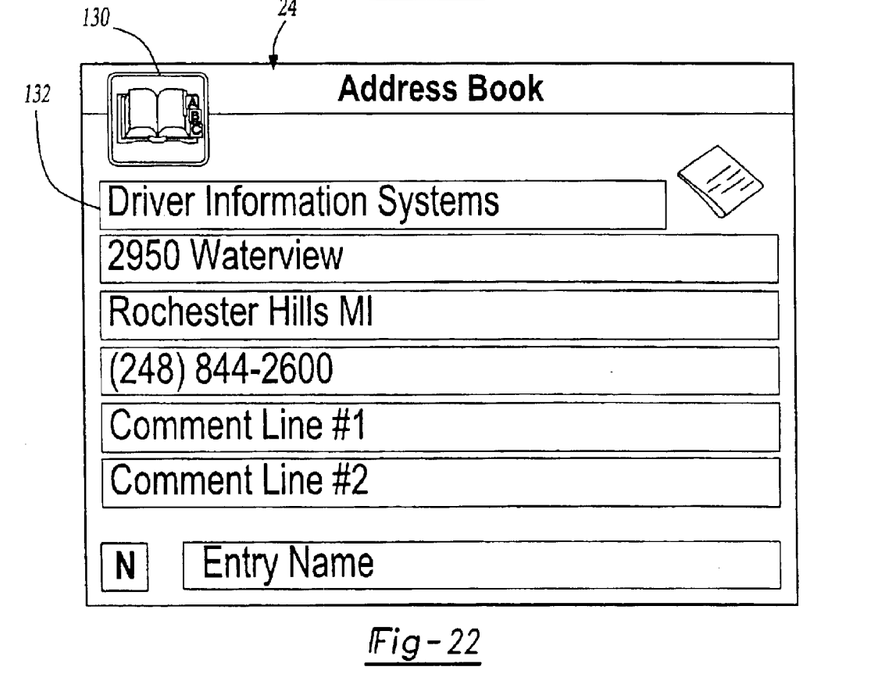
FIG. 22 illustrates the address book screen displayed upon selection of the address book icon.

FIG. 22 illustrates the address book screen including a thumbnail address book icon 130 in the upper left corner of the display 24. The address book screen contains previously stored names and addresses 132 which the user can scroll through or select or enter using the input device 26. The user can then select to be routed to the associated destination.

Preferably, the navigation system 20 permits the user to change the color themes of the display 24 to match or coordinate with the interior of the vehicle. Preferably, the user can select the color themes and other options utilizing radio buttons or check boxes on the display 24.

The intensity or brightness of the display is preferably automatically adjusted based upon the time of day, time of the year and geographical location, all of which can be determined by the GPS receiver. The GPS receiver receives time of day and time of year information from the GPS satellites. The GPS receiver and the other positions determining sensors all well as the map matching and other position determining software determine the geographic location of the vehicle 32. Based upon this information, the navigation system can determine the expected ambient light and adjust the brightness and intensity of the display 24 appropriately, i.e. increasing the brightness and intensity of the display 24 during the day and decreasing the brightness and intensity of the display 24 at night.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle navigation system comprising:
   a database of locations;
   a display displaying a plurality of icons, each associated with at least one of said locations in said database; and
   a user input device selectively activating one of said plurality of icons, said display animating said activated icon in response to selection of the activated icon by the user input device.

2. The vehicle navigation system of claim 1 further including
   a system for determining the position of the vehicle relative to said database;

said user input device selecting a desired destination relative to said database;

a system for determining a route from said database between a position of the vehicle to said desired destination.

3. The vehicle navigation system of claim 1 wherein each said icon is associated with a group of locations in said database, said user input device selecting a desired destination from among said locations associated with said group associated with said activated icon.

4. The vehicle navigation system of claim 1 further including:

a base frame comprising information for displaying a first icon of said plurality of icons;

at least one transition file comprising information for changing the display of said first icon, said display first displaying said first icon based upon said base frame and subsequently changing said display of said first icon based upon said at least one transition file to provide animation of the first icon.

5. The vehicle navigation system of claim 4 wherein said first icon at includes a plurality of pixels, said base frame including information for displaying all of said plurality of pixels, said transition file comprising information for displaying only a subset of said plurality of pixels less than all of said plurality of pixels.

6. The vehicle navigation system of claim 5 further including a plurality of base frames, each including different information for displaying all of said pixels for said icon.

7. The vehicle navigation system of claim 5 further including a plurality of said transition files, each including information for modifying said display from one state to another incremental state.

8. The vehicle navigation system of claim 1 wherein the display enlarges the activated icon in response to the activation of the activated icon by the user input device.

9. The vehicle navigation system of claim 1 further including a text flag displayed on the display next to the animated icon in response to the activation of the activated icon by the user input device, the text flag indicating the locations in the database with which said animated icon is associated.

10. The vehicle navigation system of claim 1 wherein said activated icon is animated by said display displaying a plurality of frames of said activated icon.

11. A method for operating a graphical user interface in a vehicle navigation system including the steps of:

a) displaying a plurality of icons on a display;

b) animating at least one of the plurality of icons on the display;

c) selecting at least one of the animated icons.

12. The method of claim 11 further including the steps of:

d) displaying said icon based upon a base frame comprising information for displaying said plurality of pixels;

e) changing said display of said icon based upon a transition file comprising information for displaying a subset of said plurality of pixels, less than all of said plurality of pixels.

13. The method of claim 12 further including the steps of:

f) in said step b), displaying a first frame comprising said base frame;

g) after said step f), displaying a second frame comprising said base frame as modified according to said transition file.

14. The method of claim 13 further including the steps of:

associating each of said plurality of icons with at least one destination; and selecting a destination associated with said at least one of the animated icons selected in said step c).

15. The method of claim 11 further including the steps of:

determining a current position;

selecting said at least one of said plurality of icons animated in said step b);

selecting a desired destination associated with said at least one of said plurality of icons; and determining a route from said current position to said desired destination.

16. The method of claim 11 further including the steps of:

d) displaying an associated screen in response to said step c);

e) displaying a smaller version of the at least one icon on the associated screen.

* * * * *